(12) United States Patent
Rydenhag et al.

(10) Patent No.: US 9,326,019 B2
(45) Date of Patent: Apr. 26, 2016

(54) DEVICE AND METHOD FOR GENERATING MESSAGE ITEM DISPLAY DATA

(71) Applicant: Research In Motion Limited, Waterloo (CA)

(72) Inventors: Daniel Tobias Rydenhag, Gothenburg (SE); Per Åke Daniel Johansson, Malmö (SE); Per Erik Anders Jorisch, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 220 days.

(21) Appl. No.: 13/774,510

(22) Filed: Feb. 22, 2013

(65) Prior Publication Data

US 2014/0245174 A1   Aug. 28, 2014

(51) Int. Cl.
*H04L 12/58* (2006.01)
*H04N 21/414* (2011.01)
*G06Q 30/02* (2012.01)
*H04N 21/431* (2011.01)
*H04N 21/81* (2011.01)

(52) U.S. Cl.
CPC ......... *H04N 21/41407* (2013.01); *G06Q 30/02* (2013.01); *H04N 21/4312* (2013.01); *H04N 21/8126* (2013.01)

(58) Field of Classification Search
CPC ... G06Q 10/107; G06Q 10/10; G06Q 10/109; H04L 12/581; G06F 3/0482
USPC ........................................................ 715/752
See application file for complete search history.

(56) References Cited

U.S. PATENT DOCUMENTS

| 5,487,143 | A  | * | 1/1996  | Southgate ..................... 715/790 |
| 6,684,088 | B1 | * | 1/2004  | Halahmi .............. G06Q 10/107 |
|           |    |   |         | 455/412.1 |
| 6,832,244 | B1 | * | 12/2004 | Raghunandan ............... 709/206 |
| 7,457,879 | B2 | * | 11/2008 | Horvitz et al. .................. 709/227 |
| 7,653,879 | B1 | * | 1/2010  | Sareen et al. .................. 715/752 |
| 7,725,832 | B2 | * | 5/2010  | Cadiz et al. ................... 715/736 |
| 8,745,147 | B2 | * | 6/2014  | Bryan et al. .................. 709/206 |

(Continued)

FOREIGN PATENT DOCUMENTS

| WO |    02/069227 A1 | 9/2002 |
| WO | 2008/025119 A1 | 3/2008 |

OTHER PUBLICATIONS

"Visualizing Electronic Mail" by Sudarsky et al. dated 2002; http://ieeexplore.ieee.org/xpls/abs_all.jsp?arnumber=1028749&tag=1; last accessed Oct. 7, 2014.*

(Continued)

*Primary Examiner* — Jung-Mu Chuang
(74) *Attorney, Agent, or Firm* — Jon Gibbons; Fleit Gibbons Gutman Bongini & Bianco P.L.

(57) ABSTRACT

A device is described. The device comprises a processor configured to communicate with a display and detect a user selection indicative of a message items view. The processor, in response to the detected user selection, is further configured to obtain message data items via a message application executable on the device; arrange the message data items in a two-dimensional scheme; generate display data of the two-dimensional scheme of message data items for display; and output the generated data to the display. A method for a device is also described.

23 Claims, 6 Drawing Sheets

(56) References Cited

U.S. PATENT DOCUMENTS

| | | | |
|---|---|---|---|
| 2002/0063714 A1* | 5/2002 | Haas | G06F 17/30017 345/473 |
| 2002/0120702 A1* | 8/2002 | Schiavone et al. | 709/207 |
| 2003/0097361 A1* | 5/2003 | Huang et al. | 707/10 |
| 2005/0004989 A1 | 1/2005 | Satterfield et al. | |
| 2007/0288932 A1* | 12/2007 | Horvitz et al. | 719/313 |
| 2008/0052372 A1* | 2/2008 | Weber et al. | 709/217 |
| 2008/0094369 A1* | 4/2008 | Ganatra | G06F 3/04883 345/173 |
| 2009/0031247 A1* | 1/2009 | Walter et al. | 715/788 |
| 2009/0051703 A1 | 2/2009 | Ikeda et al. | |
| 2010/0159967 A1 | 6/2010 | Pounds et al. | |
| 2010/0199190 A1* | 8/2010 | Cadiz et al. | 715/736 |
| 2011/0126126 A1* | 5/2011 | Blair | G06Q 10/107 715/752 |
| 2011/0196933 A1* | 8/2011 | Jackson et al. | 709/206 |
| 2011/0288962 A1* | 11/2011 | Rankin, Jr. | G06F 17/30525 705/27.1 |
| 2012/0021399 A1* | 1/2012 | Cvencek | G09B 7/02 434/362 |
| 2012/0150911 A1* | 6/2012 | Arquie | G06F 17/30398 707/780 |
| 2012/0162266 A1* | 6/2012 | Douglas | G06F 3/0481 345/677 |
| 2012/0173339 A1* | 7/2012 | Flynt | G06F 3/0481 705/14.58 |
| 2012/0253916 A1* | 10/2012 | Ayloo | G06Q 30/02 705/14.35 |
| 2012/0284639 A1* | 11/2012 | Yuniardi et al. | 715/752 |
| 2013/0041965 A1* | 2/2013 | Bryan et al. | 709/206 |
| 2013/0041968 A1* | 2/2013 | Cohen | H04L 12/587 709/206 |
| 2013/0285914 A1* | 10/2013 | Pasquero | G06F 3/0237 345/168 |
| 2013/0305175 A1* | 11/2013 | Blackburn et al. | 715/765 |
| 2014/0040756 A1* | 2/2014 | Bukurak | G06F 3/017 715/741 |
| 2014/0143683 A1* | 5/2014 | Underwood et al. | 715/752 |
| 2014/0222939 A1* | 8/2014 | Bryan et al. | 709/206 |

OTHER PUBLICATIONS

Extended European Search Report from related European Patent Application No. 13156472.6 dated Jul. 12, 2013; 8 pages.

* cited by examiner

DEVICE AND METHOD FOR GENERATING MESSAGE ITEM DISPLAY DATA

TECHNICAL FIELD

The present disclosure relates to a device and method for generating display data.

BACKGROUND

It is often time consuming to access and review multiple items, e.g., message items, from a list view. For example, when a person typically accesses and views their email messages, the messages are provided in a one-dimensional list. Each message then has to be individually opened by using an input device so that it can be reviewed. This can be time consuming and involve many discrete server requests just messages can be reviewed.

BRIEF DESCRIPTION OF THE DRAWINGS

The present disclosure can be understood with reference to the description of the embodiments set out below, in conjunction with the appended drawings in which.

DESCRIPTION

In a first aspect, there is provided a device comprising: a processor configured to communicate with a display and detect a user selection indicative of a message items view; the processor, in response to the detected selection, is further configured to: obtain message data items via a message application executable on the device; arrange the message data items in a two-dimensional scheme; generate display data of the two-dimensional scheme of message data items for display; and output the generated data to the display.

In one embodiment, the device may comprise an input device configured to detect the user selection and wherein the processor is configured to generate the display data based on the user selection.

In one embodiment, each message data item may comprise one or more of subject, sender/recipient, attachment, message body, header, or importance.

In one embodiment, the processor may be configured to arrange each message data item in the two-dimensional scheme to include one or more of subject, sender/recipient, attachment, message body, header, or importance.

In one embodiment, each message data item may comprise a message body and the generated display data for each message data item comprises at least a portion of the message body.

In one embodiment, the processor may be configured to receive user entered data indicative of a user input command related to a message data item.

In one embodiment, the user entered data may be indicative of a user selection of a message data item to be removed from the two-dimensional scheme, wherein the processor may be configured to remove the user selected message data item from the two-dimensional scheme.

In one embodiment, the processor may be configured to generate display data pertaining to a reduced display of the selected message data item for a predetermined period of time before the selected message data item is removed from the two-dimensional scheme.

In one embodiment, the user entered data may indicative of a user selection of a message data item to view options associated with the selected message data item, wherein the processor may be configured to update the display data of the user selected message data item of the two-dimensional scheme to include user selectable options associated with the selected message data item.

In one embodiment, the user selectable options may comprise one or more of dismiss, reply, read, forward, save, delete, or update importance.

In one embodiment, the user entered data may be indicative of a user selection of a message data item to view the full message body of the message data item, wherein the processor may be configured to update the display data of the user selected message data item of the two-dimensional scheme to include the full message body of the selected message data item.

In one embodiment, the processor may be configured to update the message data items of the message application in response to user selections associated with the message data items.

In one embodiment, the message data items may be arranged along a first axis according to a first criterion of the message data items and a second axis according to a second criterion of the message data items.

In one embodiment, the message data items may be arranged in the two-dimensional scheme in accordance with one or more criteria, comprising urgency, sender/recipient, message date or calendar event.

In one embodiment, the message data items may relate to unopened message items.

In a second aspect, there is provided a method for a device comprising the steps of: detecting a user selection indicative of a message items view, and in response to the detected user selection, perform the steps of: obtaining message data items via a message application executable on the device; arranging the message data items in a two-dimensional scheme; generating display data of the two-dimensional scheme of message data items for display; and outputting the generated data to a display.

In one embodiment, the method may comprise detecting the user selection and generating the display data based on the user selection.

In one embodiment, each message data item may comprise one or more of subject, sender/recipient, attachment, message body, header, or importance.

In one embodiment, the method may comprise arranging each message data item in the two-dimensional scheme to include one or more of subject, sender/recipient, attachment, message body, header, or importance.

In one embodiment, each message data item may comprise a message body and the generated display data for each message data item comprises at least a portion of the message body.

In one embodiment, the method may comprise receiving user entered data indicative of a user input command related to a message data item.

In one embodiment, the user entered data may be indicative of a user selection of a message data item to be removed from the two-dimensional scheme, and wherein the method may comprise the step of removing the user selected message data item from the two-dimensional scheme.

In one embodiment, the method may comprise generating display data pertaining to a reduced display of the selected message data item for a predetermined period of time before the selected message data item is removed from the two-dimensional scheme.

In one embodiment, the user entered data is indicative of a user selection of a message data item to view options associated with the selected message data item, and wherein the method may comprise the step of updating the display data of the user selected message data item of the two-dimensional scheme to include user selectable options associated with the selected message data item.

In one embodiment, the user selectable options may comprise one or more of dismiss, reply, read, forward, save, delete, or update importance.

In one embodiment, the user entered data may be indicative of a user selection of a message data item to view the full message body of the message data item, and wherein the method may comprise the step of updating the display data of the user selected message data item of the two-dimensional scheme to include the full message body of the selected message data item.

In one embodiment, the method may comprise the step of updating the message data items of the message application in response to user selections associated with the message data items.

In one embodiment, the message data items may be arranged along a first axis according to a first criterion of the message data items and a second axis according to a second criterion of the message data items.

In one embodiment, the message data items may be arranged in the two-dimensional scheme in accordance with one or more criteria, comprising urgency, sender/recipient, message date or calendar event.

In one embodiment, the message data items may relate to unopened message items.

In a third aspect, there is provided a computer-readable medium comprising executable instructions which, when executed, cause a processor to perform the above methods. The executable instructions may be computer-executable instructions. A device may be configured to receive the executable instructions from the computer-readable medium, and/or comprise the executable instructions, and be configured to execute the executable instructions.

In a fourth aspect, there is provided a device configured to perform one or more of the above methods. The device may further comprise a processor configured to perform one or more of the above methods. The processor may comprise one or more discrete electronic components.

Figure 1:
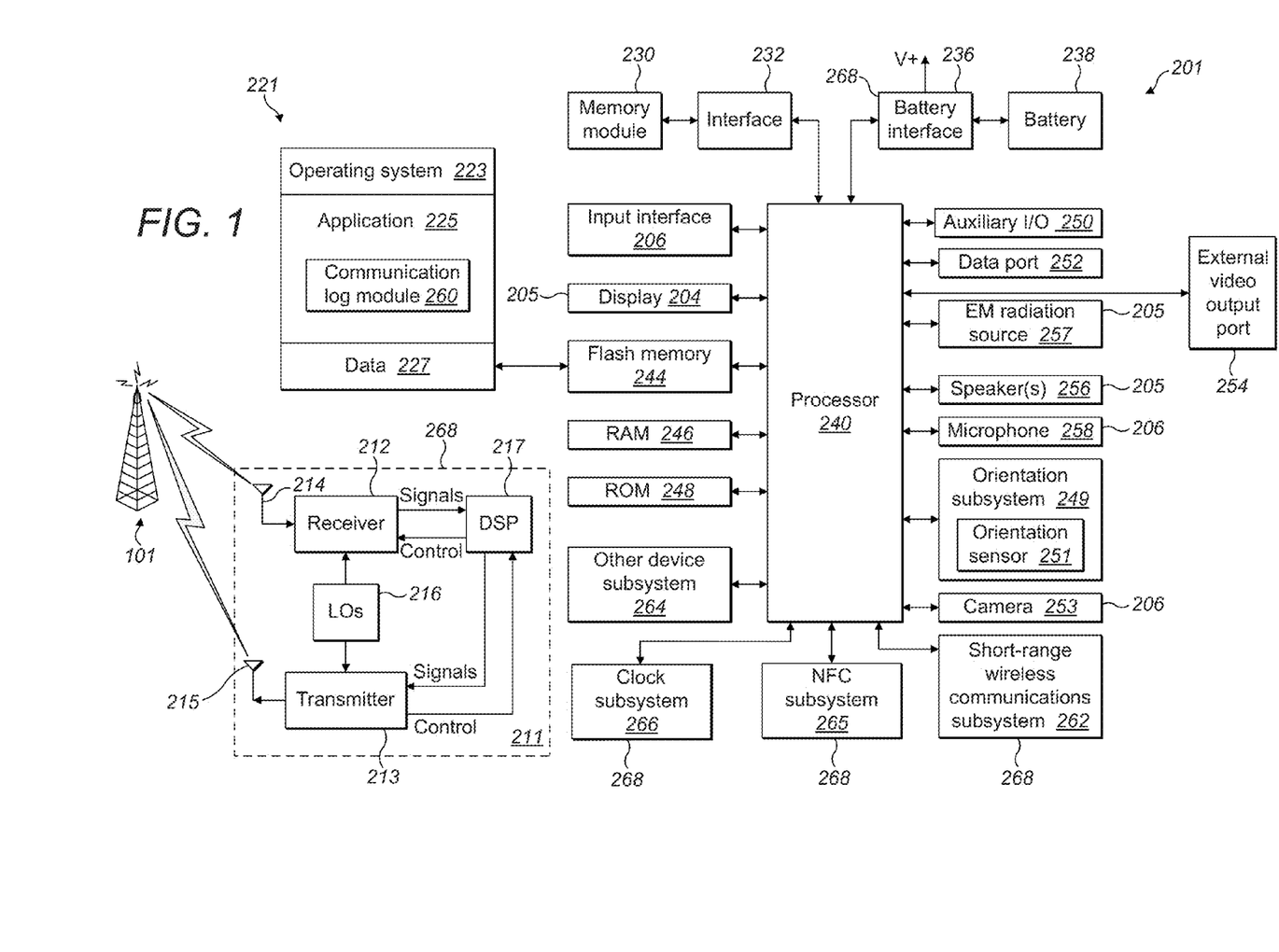
FIG. 1 is a schematic diagram illustrating components of an exemplary electronic device usable by a user in some embodiments.

Reference is made to FIG. 1 which illustrates an exemplary electronic device 201 which is usable in accordance with the disclosure below. An electronic device 201 such as the electronic device 201 of FIG. 1 is configured to generate a user-controllable interface on a built-in display or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in other embodiments, some of the features, systems or subsystems of the electronic device 201 discussed below with reference to FIG. 1 may be omitted from electronic devices 201 which are intended to perform solely operations in relation to the generation and output of display data and the modification of media content output.

In the illustrated exemplary embodiment, the electronic device 201 is a communication device and, more particularly, is a mobile communication device having data and voice communication capabilities, and the capability to communicate with other computer systems; for example, via the Internet. It will be appreciated that the electronic device 201 may take other forms, including any one of the forms listed below. Depending on the functionality provided by the electronic device 201, in certain exemplary embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one exemplary embodiment is the flash memory 244. In various exemplary embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain exemplary embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some exemplary embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an example, the user input comprises a swipe gesture across the touchscreen interface 206.

In at least some exemplary embodiments, the touch-sensitive overlay has a touch-sensitive input surface which is larger than the display 204. For example, in at least some exemplary embodiments, the touch-sensitive overlay may extend overtop of a frame (not shown) which surrounds the display 204. In such exemplary embodiments, the frame (not shown) may be referred to as an active frame since it is capable of acting as an input interface 206. In at least some exemplary embodiments, the touch-sensitive overlay may extend to the sides of the electronic device 201.

As noted above, in some exemplary embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some exemplary embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (DIA) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some exemplary embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some exemplary embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some exemplary embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some exemplary embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some exemplary embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some exemplary embodiments, the orientation subsystem 249 includes other orientation sensors 251, instead of or in addition to accelerometers. For example, in various exemplary embodiments, the orientation subsystem 249 may include a gravity sensor, a gyroscope, a tilt sensor, an electronic compass or other suitable sensor, or combinations thereof. In some exemplary embodiments, the device orientation subsystem 249 may include two or more orientation sensors 251 such as an accelerometer and an electronic compass.

The electronic device 201, in at least some exemplary embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some exemplary embodiments, an electronic device 201 includes a plurality of speakers 256. For example, in some exemplary embodiments, the electronic device 201 includes two or more speakers 256. The two or more speakers 256 may, for example, be disposed in spaced relation to one another. That is, in at least some exemplary embodiments, the electronic device 201 may include a first speaker and a second speaker and the first speaker and the second speaker may be spatially separated from one another within the electronic device 201. In at least some exemplary embodiments, the display 204 may be disposed between the first speaker and the second speaker of the electronic device. In such exemplary embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some exemplary embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some exemplary embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such exemplary embodiments, the direction of capture of the camera is always predictable relative to the display 204 or the housing. In at least some exemplary embodiments, the camera may be provided in a central location relative to the display 204 to facilitate image acquisition of a face.

In at least some exemplary embodiments, the electronic device 201 includes an electromagnetic (EM) radiation source 257. In at least some exemplary embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some exemplary embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some exemplary embodiments, the electromagnetic radiation source 257 is an infrared (IR) radiation source which is configured to emit infrared radiation. In at least some exemplary embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some exemplary embodiments, the camera 253 is configured to capture at least some electromagnetic radiation which is not in the visible spectrum.

In some exemplary embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some exemplary embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some exemplary embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the exemplary embodiment of FIG. 1, the media player module 260 is implemented as a stand-alone application 225. However, in other exemplary embodiments, the presentation module 260 could be implemented as part of the operating system 223 or other applications 225.

As discussed above, electronic devices 201 which are configured to perform operations in relation to a communications log may take a variety of forms. In at least some exemplary embodiments, one or more of the electronic devices which are configured to perform operations in relation to the presentation module 260 are a smart phone or a tablet computer.

Figure 2:
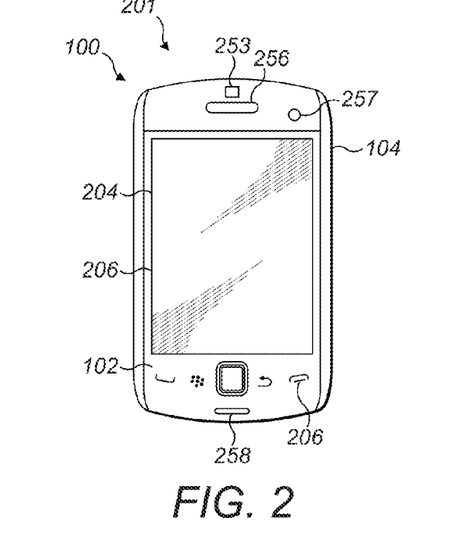
FIG. 2 is a plan view of the upper external side of one exemplary electronic device usable by an end-user in some embodiments.

Referring now to FIG. 2, a front view of an exemplary electronic device 201 which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 1, or a subset of those components. The smartphone 100 includes a housing 104 which houses at least some of the components discussed above with reference to FIG. 1.

In the exemplary embodiment, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the exemplary embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the exemplary embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other exemplary embodiments, the smartphone 100 may include a greater number of speakers 256. For example, in at least some exemplary embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

Figure 3:
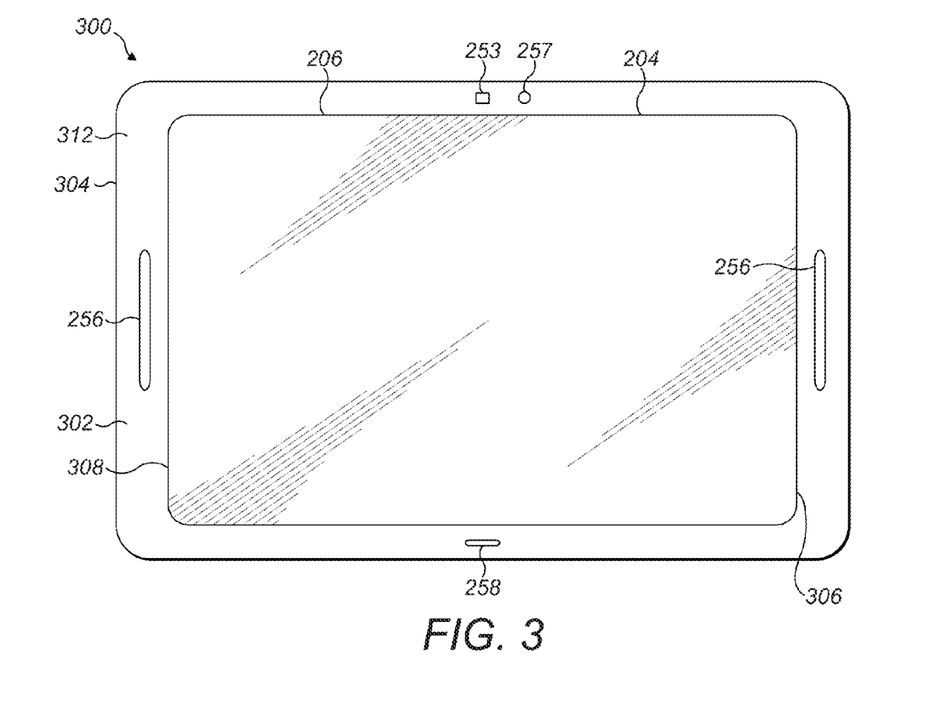
FIG. 3 is a plan view of the upper external side of one alternative exemplary electronic device usable by an end-user in some embodiments.

Referring now to FIG. 3, a front view of an example electronic device 201, which in one example may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the exemplary embodiment illustrated, the display 204 is framed by the housing 304.

A frame 312 surrounds the display 204. The frame 312 is portion of the housing 304 which provides a border around the display 204. In at least some exemplary embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The exemplary tablet computer 300 includes a plurality of speakers 256. In the exemplary embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The exemplary tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other exemplary embodiments.

The exemplary tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a website using a browser on any internet-enabled electronic device.

Figure 4:
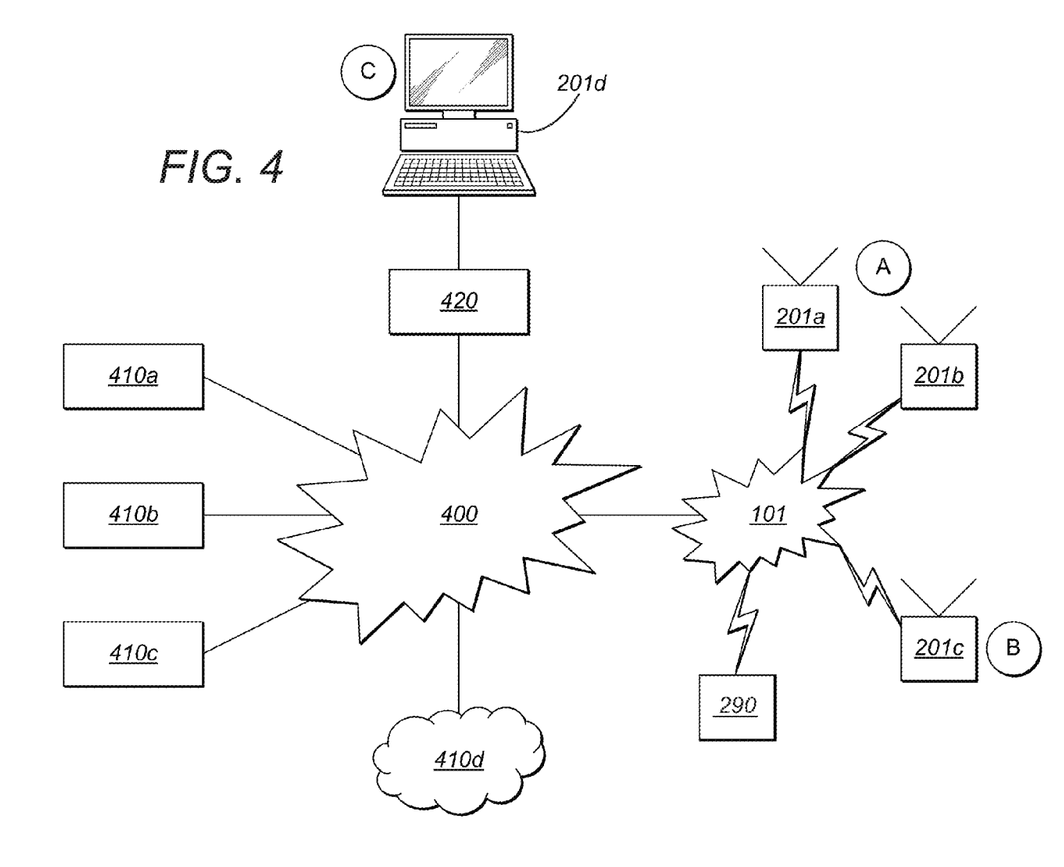
FIG. 4 is a schematic diagram of an exemplary system in which the aforementioned electronic devices can be employed in some exemplary embodiments.

FIG. 4 shows a system of networked apparatus by which electronic communications can be sent and received using multiple electronic devices 201*a*, 201*b*, 201*c*. Referring to FIG. 4, electronic devices 201*a*, 201*b* and 201*c* are connected to wireless network 101 to perform voice and data communications, and to transmit data to an external display device 290 residing on the wireless network. Wireless network 101 is also connected to the communications network 400, e.g. Internet. Electronic device 201*a* may be a tablet computer similar to tablet computer 300 described in FIG. 2 above. Electronic devices 201*b* and 201*c* may be smartphones. Electronic device 201*d* is a computing device such as a notebook, laptop or desktop, which is connected by a wired broadband connection to Local Area Network 420, and which is also connected to the communications network 400. Electronic devices 201*a, b, c, d* may access the communications network 400 to perform data communications therewith.

Servers 410*a*, 410*b*, 410*c* and 410*d* are also connected to the communications network 400 and one or more of them may individually or together support electronic communications services available to end-users of electronic devices 201*a*, 201*b*, 201*c* and 201*d*, enabling them to send and receive electronic communications. Servers 410*a*, 410*b*, 410*c* and 410*d* may be web servers or communications servers, such as email servers.

Other servers and services may of course be provided allowing users of electronic devices 201*a*, 201*b*, 201*c* and 201*d* to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201*b* may use wireless network 101 to make telephony calls, video calls, send text messages, send multimedia messages, and send instant messages to smart phone 201*c*, and to display application data on a display screen of the external display device 290, or control the display of application data.

The example shown in FIG. 4 is intended to be non-limiting and additional network infrastructure may of course be provided, such as a Public Switched Telephone Network (not shown), which may be used, for example, to make telephony calls using smartphone 201*b* to a wired phone (not shown).

In order to explain certain example modes of operation, reference is made below to FIGS. 5 and 6.

Figure 5:
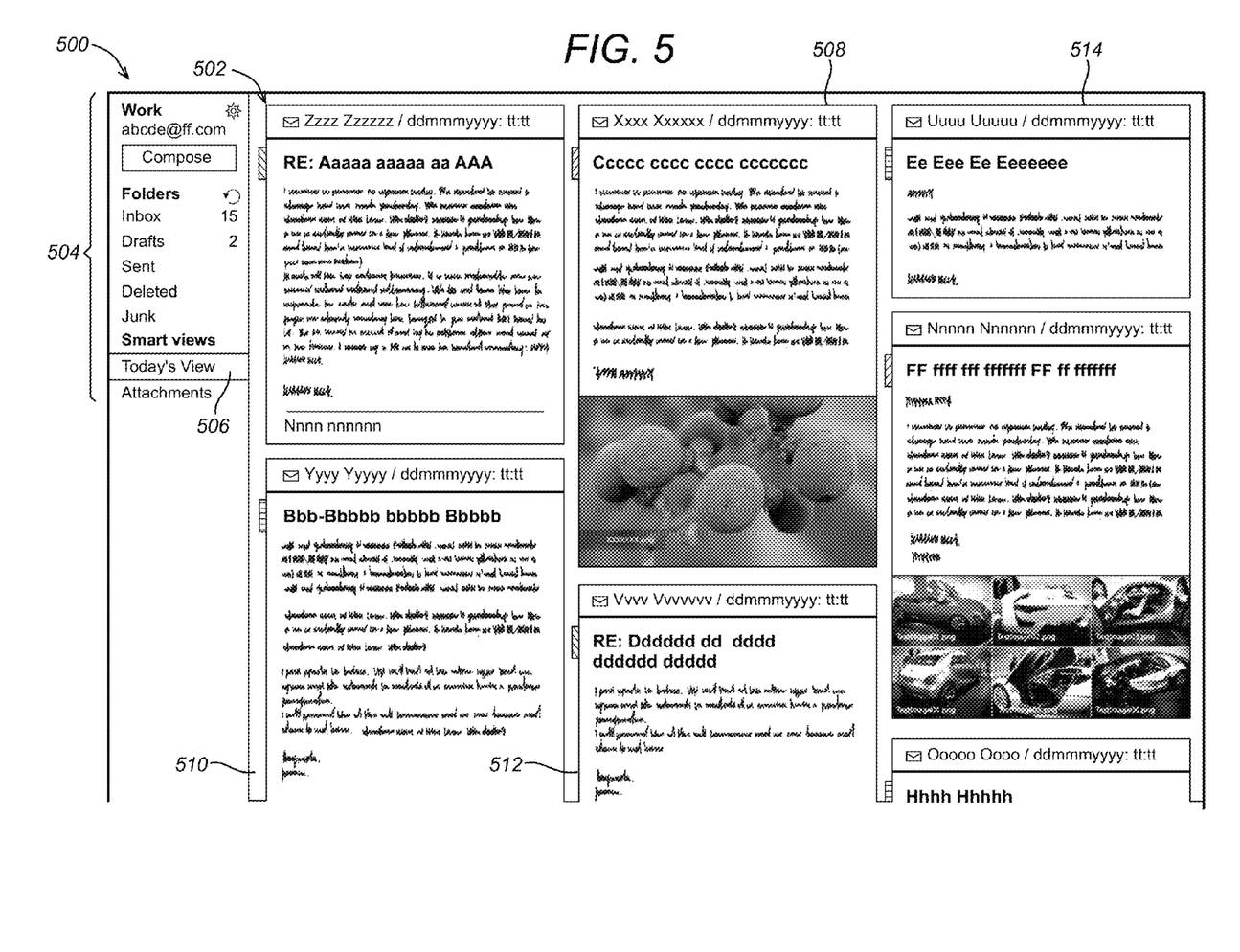
FIG. 5 illustrates a display of message items.

FIG. 5 illustrates a display 500 generated by the processor 240 of the device 300 e.g. tablet computer 300, for example. This exemplary embodiment it preferably suited to devices with larger displays than those typically found on smaller handheld devices. This example relates to message items, such that the processor 240 of the device 300 may obtain message data items from a message application that is executed on a separate device, for example, the device 100 illustrated in FIG. 2. Alternatively, the device 300 may be running a message application, where message items are obtained from server.

The display 500 includes a message viewer or smart view/display 502 that allows a viewer to more easily review message items and act on the message items, for example, email messages.

The display 500 includes one or more selectable display objects 504 executable on the processor 240 of the device 300 that may be representative of an application or part of an application stored in the memory (flash memory 244) or installed on the device 300. In this case, responsive to detection of a user input selecting one of the selectable display objects, the processor 240 'opens' or 'runs' the application (i.e. begins execution of the instructions associated with the application). The selectable display objects 504 are illustrated on the left hand side of the display 500, and include a selectable display object 506, that allows a user to view multiple message items in a single view based on a single user selection or "click", to more quickly and easily determine what action needs to be taken with regard to the message items. In this exemplary embodiment, when a user selects the display object 506 (labelled "Today's View" in the figure), the processor generates a display pertaining to a message item review window display or smart view 502.

When a user selection to review message items is detected by the processor 240 of the device 300, via the input device 206, for example, the processor obtains message data items from a message application associated with the device 300. For example, in this exemplary embodiment, the message items are obtained from an email application executable on the device 300. Furthermore, the message review may from part of a message application, such that the message reviewer application is within the message application executable on the device 300.

Each message data item obtained from the message application relates to a previously unopened or unread message item in this exemplary embodiment. That is to say that the message item may never have been opened, or may have been opened, but marked unread. Each message data item includes data relating to one or more of a message subject, a message sender or recipient, an attachment, a message body, a message header or data relating to importance, urgency or privacy.

The processor 240 of the device 300 arranges the obtained message items in a two-dimensional scheme, or array of message items, as illustrated in the display view 502. For example, the message data items are arranged in three columns in this example, as illustrated in the figure. The message items are arranged in columns according to one or more criteria of the message items. For example, the message items may be arranged in different columns or along a first axis based on urgency, sender/recipient, message date or calendar event of the message data item. Alternatively, there may be no specific arrangement of the messages, rather the message items may be arranged to best utilise the display area available.

The message items are also arranged within the columns, or along a second axis, according to one or more different criteria of the message items. For example, the message items may be arranged within the columns based on urgency, sender/recipient, message date or calendar event of the message item. In this example, the messages are arranged within each column based on date of receipt, with the newest or most recent at the top The processor 240 of the display device 300 generates display data that is output to the display 204 of the device 300. The display data contains data for each of the obtained message data items arranged in the two-dimensional scheme or array 502. The display data for each message data item includes one or more of the email subject, the sender/recipient, any attachments, a message body, a message header and the importance or urgency of the message data item. For example, display data of message item 508 includes a message subject, sender details, date and time of the message, the body of the message (i.e., the message) and the attached image. It will be appreciated that it may not be possible to display the entire body of the message item for all message items, based on the area of the display. Accordingly, each message data item may be given or allowed a predetermined or threshold area of the display such that if the message would otherwise extend to an area greater than the predetermined area, only a portion of the message body is displayed. In an exemplary embodiment, at least a portion of the message body of the message data item is displayed for each message data item.

The generated display data is outputted to the display 204 of the device 300 to produce the display illustrated in FIG. 5. As illustrated in the display 504, each message item, which corresponds to an unopened message item, is displayed with details related to the message (e.g., sender, date/time and subject), in addition to at least a portion of the message body and any attachments, which in this example are displayed in a smaller, e.g., thumbnail, format.

Based on the display 504 illustrated in FIG. 5, a user is able to visualise an overview of all the unopened messages from their message inbox or folders of unopened message items, obtained from a message application. It will be appreciated that although preferably all the messages will be displayed on a single viewable display, it may be necessary to provide a scroll bar (not illustrated) so that a viewer may scroll down the page. This is because, if the message items are reduced so that all message items are displayed on a single viewable display (i.e., without the need for scrolling), the information or data provided for each message item may not be sufficient for a user to easily review the content of the message item and make a decision regarding what, if any, action is required.

The user is able to look over the display of message items 502 and select a message that he or she has read. In this example, a user, via the input device 206 of the device 300, selects a message item once it is read. For example, the user input device 206 is a touch screen that allows the user to touch the display 204 of the device 300 at the location of the message item to make a selection as is known in the art. A selection of a message item may be made anywhere within the area of a chosen message item. Alternatively, each message item may be provided with a check or tick box to make a selection, or other form of tab or specific selection point/location within the message item.

Once a message item is selected, it is considered to be read, and the processor 240, upon receipt of the message item selection from the input device 206, will update or generate a display to reflect that the message has been read and selected as read. In this example, three message items 510, 512, 514 are selected as read, and FIG. 6 is used to describe how the display 502 is updated after the selection is made.

Figure 6:
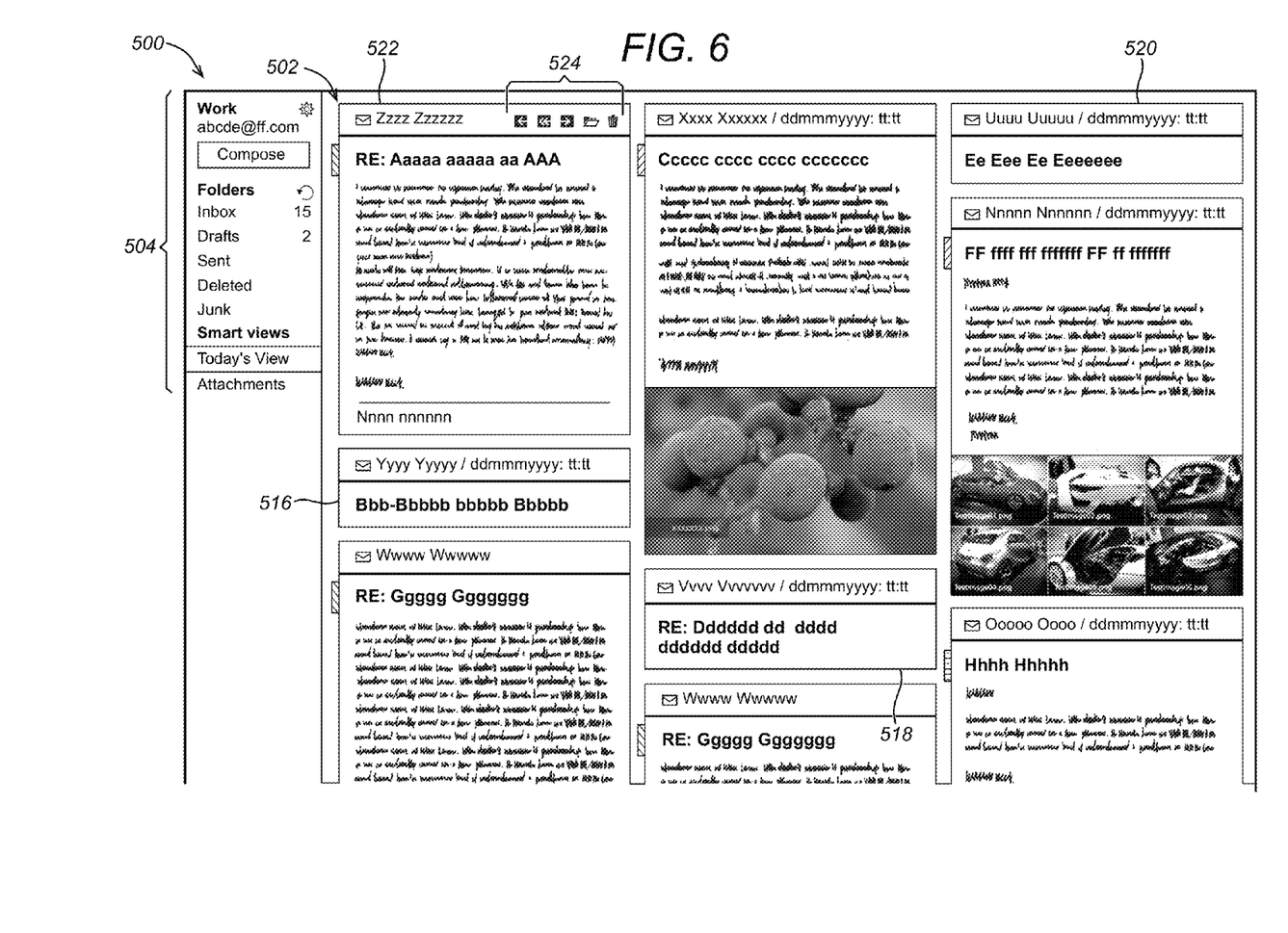
FIG. 6 illustrates an updated display based on the display illustrated in FIG. 5.

FIG. 6 illustrates the overview or smart view display 502 illustrated in FIG. 5, after a user has selected three message items as being read or viewed (message items 510, 512, 514 illustrated in FIG. 5). In the display depicted in FIG. 6, the three selected message items 516, 518, 520 are now displayed with a reduced amount of information. This can be more clearly seen by comparing the three message items 510, 512, 514 illustrated in FIG. 5 with the corresponding message items 516, 518, 520 illustrated in FIG. 6. In this example, the message items 516, 518, 520 selected as being read are reduced in size on the display illustrated in FIG. 6 to include only a header or banner view containing the message sender, subject and time/date information. The colour of the message item may also be altered to more easily identify that the message has been read. The selected message items, which are reduced in size in the display illustrated in the figure (and may be greyed-out), may go through a further transition after a predetermined period of time to be removed from the display generated by the processor 240. The predetermined time may be, for example, an integer number of seconds between 1 and 60. In preferred embodiments, when a message item is no longer displayed in the display of message items 502, once read or selected as read, the selected message items are not deleted from the message application, rather the selected message items are no longer displayed in the smart view or display view 502.

The processor 240, while generating the display of message items to reflect that one or more messages have been read or selected, also updates the message data item within the message application to reflect that the message has been read, or opened. For example, a message data item that has been selected as read in the display view 502 is updated accordingly and the message data item is marked as read or opened within the message application. Thus, if a user goes to a more typical list view of message items, the selected message item will appear in the list view be present and will be displayed as read or opened, even though it would no longer be displayed in the overview display 502

The user may also perform other actions related to each message. The user is provided with a number of display objects 524, which relate to actions that may be performed on the message, including, reply, delete, reply all, forward, view full message body, view attachment in a larger view, save attachment, save message, mark as urgent, mark as private, or update urgency. A further selected action may include marking the message as read, or unread. These actions may be presented to a user as selectable display icons 524 within the display of the message item. For example, message item 522 is provided with a number of selectable display objects 524 in a header portion of the message item. These selectable display objects may be generated by the processor 240 and displayed in response to a user input detected using the input device 204. For example, a user may move a displayed cursor to the displayed header portion of the message item, or may use a touchscreen input device to select the message at the position of the message header. This selection is preferably different to marking the message as read. Once a message item 522 is selected a number of selectable display icons 524 are generated by the processor 240 of the device 300 and displayed on the display 204. When a user selects one of the display objects, an appropriate action is performed by the processor. For example, if a user moves a cursor to the header portion of the displayed message item 522 the selectable display objects 524 are displayed and a user may select "reply". The processor will open a new message composition window or display in response to the replay selection and allow the user to replay to the message item.

Once the user has finished reviewing the messages in the review display 504, the user may select a different display object 504 from those provided on the left hand side of the display illustrated in FIGS. 5 and 6 to return to a more typical list of message items, for example. As discussed above, the list of message items will have been updated by the processor 240 within the message application to reflect the changes and selections made within the smart view display 504.

Thus, a user is able to make a single selection of a display object within a messaging environment and be provided with an overview or smart view of all unopened messages for a more accessible view to allow a user to more easily review and sort/act upon message items. It will be appreciate that in exemplary embodiments, message items are displayed in the smart view, but a different group of message items may also be displayed, for example, all messages from the same sender, or all messages received on a specific day.

Figure 7:
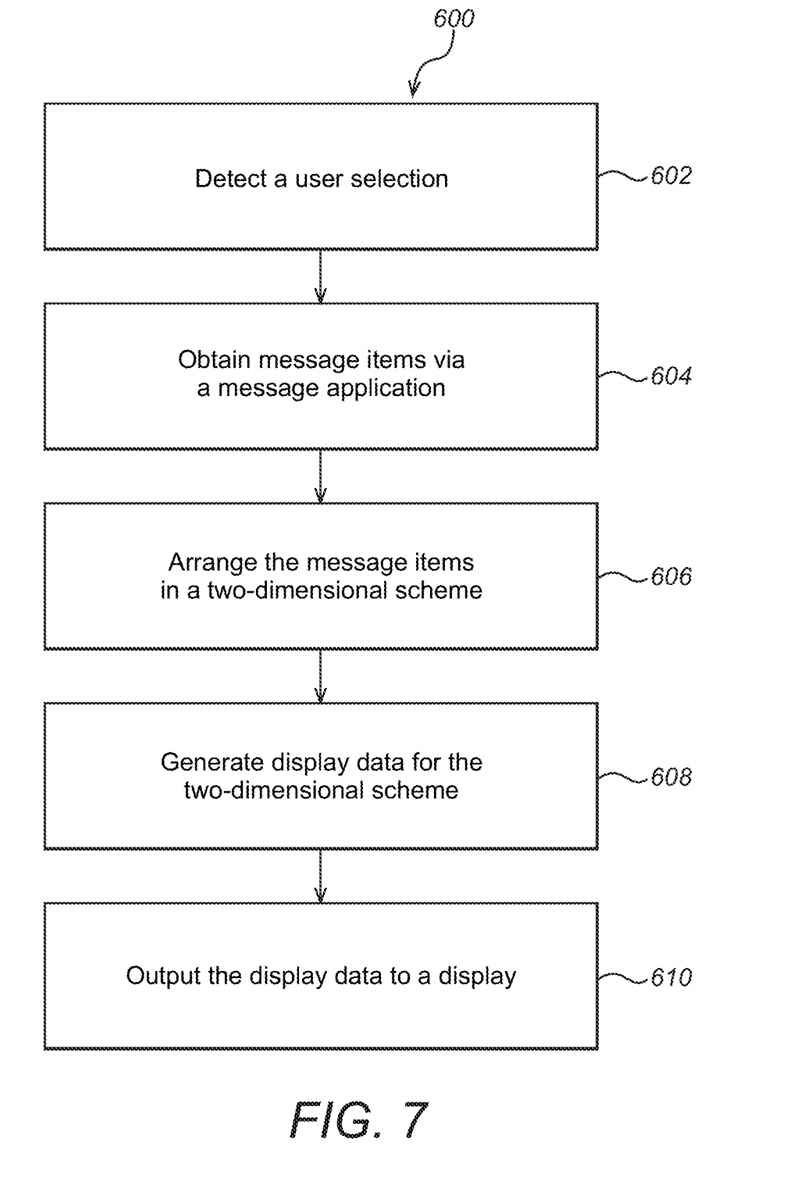
FIG. 7 is a flow diagram showing a method for generating display.

FIG. 7 is a flow chart depicting a method 600 performed by a processor 240 of any one of the devices described herein, for example device 300, for generating display data, as described in association with FIGS. 5 and 6.

At block 602, the processor 240 detects a user selection via the input device 206, for example. For example, a message application may contain a list of messages, e.g., emails. The user selection may be based on a user selecting a selectable display object that when executed provides a smart view or alternative message view of the list of message items.

At block 604, and in response to the user selection, the processor obtains data on messages via a message application. As discussed, the selectable display object may form part of a message application, such that the processor will obtain message items from a user's inbox. The obtained message items will be, in this example, unread or unopened messages. Each message item will include all the data related to the message including message sender, message body, message subject, date/time the message was received and any attachments.

At block 606, the processor arranges the message items in a two-dimensional scheme. In this example, the processor arranges display objects, each relating to a message item in a scheme or array. The message items may include selectable display objects and are arranged in columns of message items. The message items are displayed to include a least a part of message body. The message items are displayed may further include a representation of the attachment, for example in the form of a thumbnail image.

In block 608, the processor generates display data for the two-dimensional scheme.

In block 610, the display data is output to a display 204 of the device 300.

While the present application is primarily described in terms of device and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

It will be appreciated that the present invention has been described above by way of example only and other embodiments exist which fall within the scope of the appendant claims.

The invention claimed is:

1. A device comprising:
a processor configured to communicate with a display and detect a user's selection indicative of a message items view allowing the user to view multiple message data items in a single view;
the processor, in response to the detected user selection, is further configured to:
obtain the multiple message data items via a message application executable on the device;
arrange the multiple message data items according to a two-dimensional scheme;
generate display data of the two-dimensional scheme of the multiple message data items for display such that the multiple message data items can be viewed in the single view according to the two-dimensional scheme;
wherein each message data item comprises a message body and the generated display data for each message data item comprises at least a portion of the message body; and
output the generated display data to the display; and
wherein the processor is configured to receive user entered data indicative of a user input command related to a selected message data item, the user entered data indicating that the selected message data item has been viewed by the user and is to be removed from the two-dimensional scheme, wherein the processor is configured to remove the user selected and viewed message data item from the two-dimensional scheme; and
wherein, responsive to receiving the user entered data indicating that the selected message data item has been viewed, the processor is configured to generate a display data pertaining to a reduced display size of the selected message data item with a reduced amount of information comprising one of a header or banner view containing information of at least one of a message sender, a subject, a time/date, or a combination thereof for a predetermined period of time before the selected message data item is completely removed from the two-dimensional scheme without deleting the selected message data item in the message application.

2. The device of claim 1, wherein the device comprises an input device configured to detect the user selection and wherein the processor is configured to generate the display data based on the user selection.

3. The device of claim 1, wherein each message data item further comprises one or more of subject, sender/recipient, attachment, header, or importance.

4. The device of claim 1, wherein the processor is configured to arrange each message data item in the two-dimensional scheme to include one or more of subject, sender/recipient, attachment, message body, header, and importance.

5. The device of claim 1, wherein the processor is further configured to receive user entered data indicative of a user selection of a message data item to view options associated with the selected message data item, and wherein the processor is configured to update the display data of the user selected message data item of the two-dimensional scheme to include user selectable options associated with the selected message data item.

6. The device of claim 5, wherein the user selectable options comprise one or more of dismiss, reply, read, forward, save, delete, or update importance.

7. The device of claim 1, wherein the processor is further configured to receive user entered data indicative of a user selection of a message data item to view the full message body of the selected message data item, and wherein the processor is configured to update the display data of the user selected message data item of the two-dimensional scheme to include the full message body of the selected message data item.

8. The device of claim 1, wherein the processor is configured to update the message data items of the message application in response to one or more user selections associated with the message data items.

9. The device of claim 1, wherein the message data items are arranged in groupings along a first axis according to a first criterion of the message data items and within each grouping, the message data items are further arranged along a second axis according to a second criterion of the message data items.

10. The device of claim 1, wherein the message data items are arranged in the two-dimensional scheme in accordance with one or more criteria, comprising urgency, sender/recipient, message date or calendar event.

11. The device of claim 1, wherein the message data items relate to unopened message items.

12. A method for a device comprising the steps of:
detecting a user selection indicative of a message items view allowing the user to view multiple message data items in a single view, and in response to the detected selection, performing the steps of:
obtaining the multiple message data items via a message application executable on the device;
arranging the multiple message data items in a two-dimensional scheme;
generating display data of the two-dimensional scheme of message data items for display such that the multiple message data items can be viewed in the single view according to the two-dimensional scheme;
wherein each message data item comprises a message body and the generated display data for each message data item comprises at least a portion of the message body; and
outputting the generated display data to a display;
the method comprising receiving user entered data indicative of a user input command related to a selected message data item, the user entered data indicating that the selected message data item has been viewed by the user and is to be removed from the two-dimensional scheme, and wherein the method comprises the step of removing the user selected message data item from the two-dimensional scheme; and
responsive to receiving the user entered data indicating that the selected message data item has been viewed, generating display data pertaining to a reduced display size of the selected message data item with a reduced amount of information comprising one of a header or banner view containing information of at least one of a message sender, a subject, a time/date, or a combination thereof for a predetermined period of time before the selected message data item is removed from the two-dimensional scheme without deleting the selected message data item in the message application.

13. The method of claim 12, comprising detecting the user selection and generating the display data based on the user selection.

14. The method of claim 12, wherein each message data item further comprises one or more of subject, sender/recipient, attachment, header, and importance.

15. The method of claim 12, comprising arranging each message data item in the two-dimensional scheme to include one or more of subject, sender/recipient, attachment, message body, header, and importance.

16. The method of claim 12, further comprising receiving user entered data indicative of a user selection of a message data item to view options associated with the selected message data item, and wherein the method further comprises the step of updating the display data of the user selected message data item of the two-dimensional scheme to include user selectable options associated with the selected message data item.

17. The method of claim 16, wherein the user selectable options comprise one or more of dismiss, reply, read, forward, save, delete, and update importance.

18. The method of claim 12, further comprising receiving user entered data indicative of a user selection of a message data item to view the full message body of the message data item, and wherein the method further comprises the step of updating the display data of the user selected message data item of the two-dimensional scheme to include the full message body of the selected message data item.

19. The method of claim 12, comprising updating the message data items of the message application in response to user selections associated with the message data items.

20. The method of claim 12, wherein the message data items are arranged in groupings along a first axis according to a first criterion of the message data items and within each grouping, the message data items are further arranged along a second axis according to a second criterion of the message data items.

21. The method of claim 12, wherein the message data items are arranged in the two-dimensional scheme in accordance with one or more criteria, comprising urgency, sender/recipient, message date and calendar event.

22. The method of claim 12, wherein the message data items relate to unopened message items.

23. A non-transitory computer-readable medium comprising executable instructions which, when executed, cause a processor to perform a method comprising the steps of:
detecting a user selection indicative of a message items view allowing the user to view multiple message data items in a single view, and in response to the detected selection, performing the steps of:
obtaining the multiple message data items via a message application executable on the device;
arranging the multiple message data items in a two-dimensional scheme;
generating display data of the two-dimensional scheme of the multiple message data items for display such that the multiple message data items can be viewed in the single view according to the two-dimensional scheme;
wherein each message data item comprises a message body and the generated display data for each message data item comprises at least a portion of the message body; and
outputting the generated display data to a display;
the method comprising receiving user entered data indicative of a user input command related to a selected message data item, the user entered data indicating that the selected message data item has been viewed by the user and is to be removed from the two-dimensional scheme, and wherein the method further comprises the step of removing the user selected message data item from the two-dimensional scheme; and responsive to receiving the user entered data indicating that the selected message data item has been viewed, generating display data pertaining to a reduced display size of the selected message data item with a reduced amount of information comprising one of a header or banner view containing information of at least one of a message sender, a subject, a time/date, or a combination thereof for a predetermined period of time before the selected message data item is completely removed from the two-dimensional scheme without deleting the selected message data item in the message application.

* * * * *